United States Patent
Dattawadkar et al.

(10) Patent No.: US 9,651,128 B2
(45) Date of Patent: May 16, 2017

(54) TORQUE CONVERTER THRUST ASSEMBLY HAVING VARIABLE EFFECTIVE THICKNESS

(71) Applicant: Schaeffler Technologies AG & Co. KG, Herzogenaurach (DE)

(72) Inventors: Aditya Dattawadkar, Wooster, OH (US); Michael Resh, Massillon, OH (US)

(73) Assignee: Schaeffler Technologies AG Co. KG, Herzogenaurach (DE)

( * ) Notice: Subject to any disclaimer, the term of this patent is extended or adjusted under 35 U.S.C. 154(b) by 46 days.

(21) Appl. No.: 14/683,872

(22) Filed: Apr. 10, 2015

(65) Prior Publication Data
US 2016/0298742 A1    Oct. 13, 2016

(51) Int. Cl.
F16H 41/24    (2006.01)

(52) U.S. Cl.
CPC .................... *F16H 41/24* (2013.01)

(58) Field of Classification Search
CPC ........... F16H 41/24; F16D 33/18; F16D 33/20
See application file for complete search history.

(56) References Cited

U.S. PATENT DOCUMENTS

| 2002/0153222 A1* | 10/2002 | Takabayashi | F16H 41/24 192/218 |
| 2007/0144161 A1* | 6/2007 | Marathe | F16C 17/04 60/330 |
| 2014/0356102 A1* | 12/2014 | Sayre | F16B 43/00 411/531 |
| 2015/0167809 A1* | 6/2015 | Simon | F16H 41/24 60/331 |

* cited by examiner

*Primary Examiner* — Huan Le
*Assistant Examiner* — Lori Wu
(74) *Attorney, Agent, or Firm* — Davidson, Davidson & Kappel, LLC

(57) ABSTRACT

A thrust assembly for a torque converter is provided. The thrust assembly includes a drivable mating component and a thrust washer connected to the drivable mating components. The thrust washer includes a thrust surface on a first axial side thereof and at least two axial contact surfaces on a second axial side thereof opposite the first axial side. The at least two axial contact surfaces include a first axial contact surface at a first axial distance from the thrust surface and a second axial contact surface at a second axial distance from the thrust surface. The first and second axial contact surfaces are configured for alternatively contacting the axial contact surface of the drivable mating component so as to vary an effective height of the thrust surface with respect to the drivable mating component.

20 Claims, 5 Drawing Sheets

TORQUE CONVERTER THRUST ASSEMBLY HAVING VARIABLE EFFECTIVE THICKNESS

The present invention relates generally to torque converter and more specifically to thrust assemblies of torque converters.

BACKGROUND OF INVENTION

Thrust washers of different thicknesses are used into torque converters based on the dimensions of the parts of the torque converter. Alternatively, shims may be added to thrust washers to vary the thickness.

BRIEF SUMMARY OF THE INVENTION

A thrust assembly for a torque converter is provided. The thrust assembly includes a drivable mating component and a thrust washer connected to the drivable mating components. The thrust washer includes a thrust surface on a first axial side thereof and at least two axial contact surfaces on a second axial side thereof opposite the first axial side. The at least two axial contact surfaces are configured for axially contacting an axial contact surface of a first axial side of the drivable mating component. The at least two axial contact surfaces include a first axial contact surface at a first axial distance from the thrust surface and a second axial contact surface at a second axial distance from the thrust surface. The first and second axial contact surfaces are configured for alternatively contacting the axial contact surface of the drivable mating component so as to vary an effective height of the thrust surface with respect to the drivable mating component.

A method for forming a torque converter is provided. The method includes providing a thrust washer having a first axial surface forming a thrust surface and a second axial surface opposite the thrust surface. The second axial surface includes at least a first axial contact surface and a second axial contact surface. The method also includes providing a drivable mating component for mounting the thrust washer, the drivable mating component includes an axial contact surface and determining a desired effective height of the thrust surface based on a distance between the drivable mating component and a further component facing the thrust surface. The desired effective height includes a first effective height and a second effective height. The method also includes aligning the first axial contact surface to contact the axial contact surface of the drivable mating component if the desired effective height is the first effective height or aligning the second axial contact surface with the axial contact surface of the drivable mating component if the desired effective height is the second effective height.

BRIEF DESCRIPTION OF THE DRAWINGS

The present invention is described below by reference to the following drawings, in which.

DETAILED DESCRIPTION

The present disclosure provides select-fit thrust washers with variable installation tabs permitting multiple thicknesses. The thrust washer includes stepped-tabs and a mating drivable mating component includes various shaped holes such that installation in different hole sets results in different effective washer thicknesses. The tabs may also provide an anti-rotation feature. In one alternative embodiment, an axial surface of the drivable mating component includes different contact regions.

Figure 1A:
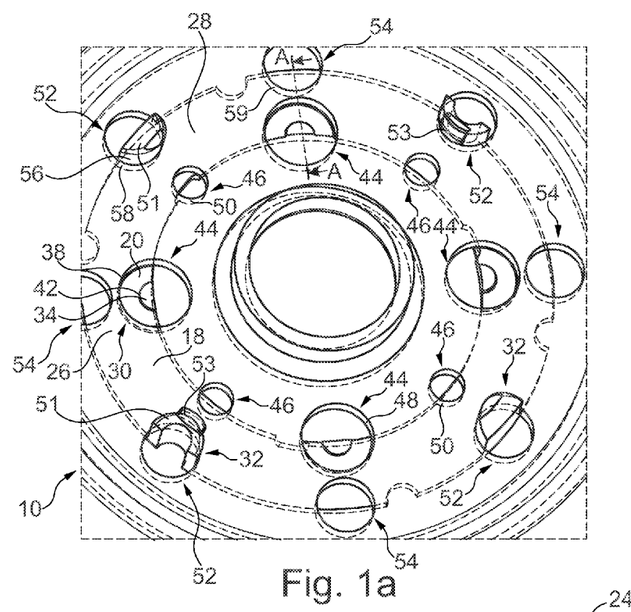
FIGS. 1a to 1c show a thrust assembly for a torque converter in accordance with an embodiment of the present invention in a first arrangement.
Figure 1B:
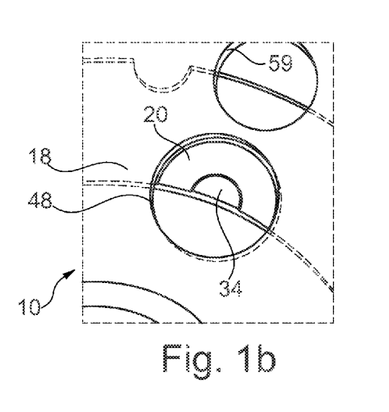
Figure 1C:
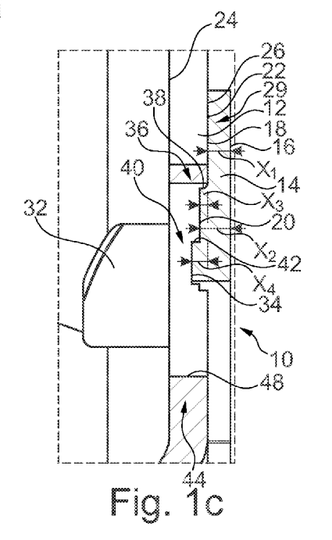

FIGS. 1a to 1c show a thrust assembly 10 for a torque converter in accordance with an embodiment of the present invention in a first arrangement. Thrust assembly 10 includes a drivable mating component 12 and a thrust washer 14 connected to drivable mating components 12. Thrust washer 14 includes an axial thrust surface 16 on a first axial side thereof facing away from drivable mating component 12 and a first axial contact surface 18 and a second axial contact surface 20 on a second axial side thereof opposite the first axial side. Drivable mating component 12 includes a first axial surface 22 facing thrust washer 14 and a second axial surface 24 facing away from thrust washer 14. FIG. 1a shows a perspective view of thrust assembly 10 showing second axial surface 24 of drivable mating component 12 and axial contact surfaces 18, 20. Although FIG. 1a shows second axial surface 24, but not first axial surface 22, portions of first axial surface 22 are identified in FIG. 1a by their corresponding locations. FIG. 1b shows a perspective view of an enlarged section of thrust assembly 10 showing second axial surface 24 of drivable mating component 12 and axial contact surfaces 18, 20. FIG. 1c shows a cross-sectional side view of a section of thrust assembly 10 along A-A in FIG. 1a.

Figure 2A:
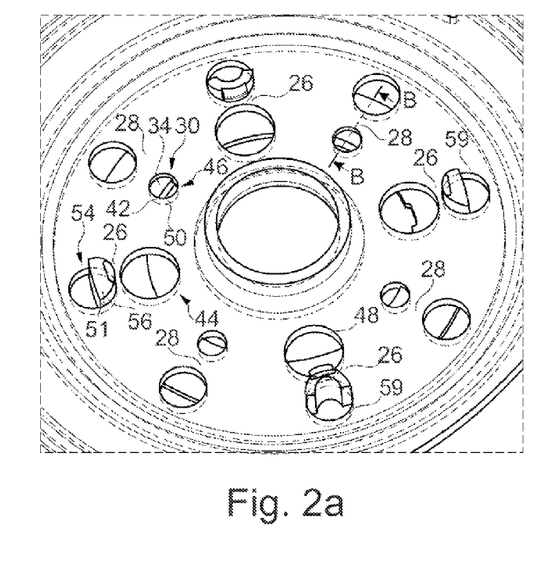
FIGS. 2a to 2c show the thrust assembly shown in FIGS. 1a to 1c in a second arrangement.
Figure 2B:
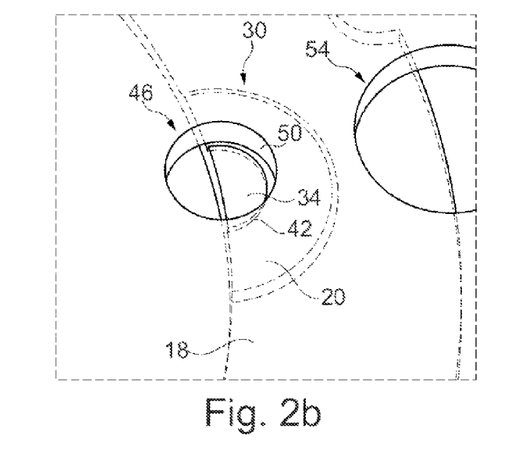
Figure 2C:
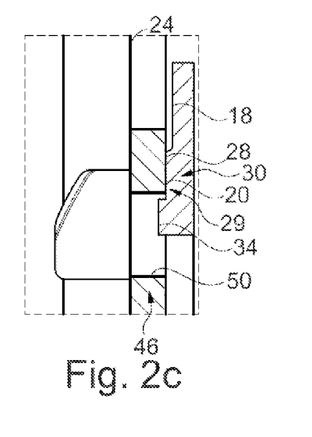

Axial contact surfaces 18, 20 are configured for axially contacting different contact regions 26, 28, respectively, of first axial surface 22 of the drivable mating component 12. First axial contact surface 18 is at a first axial distance X1 from thrust surface 16 and second axial contact surface 20 is at a second axial distance X2 from thrust surface 16. First and second axial contact surfaces 18, 20 are configured for alternatively contacting contact regions 26, 28 of a flat axial contact surface 29 of drivable mating component 12 so as to vary an effective height of thrust surface 16 with respect to drivable mating component 12. In this embodiment, thrust washer 14 has a first effective height with respect to drivable mating component 12 when thrust washer 14 is in a first arrangement with respect to drivable mating component 12 in which contact surface 18 contacts first axial surface 22 of drivable mating component 12. The first arrangement is shown in FIGS. 1a to 1c. Also in this embodiment, thrust washer 14 has a second effective height with respect to drivable mating component 12, which is greater than the first effective height, when thrust washer 14 is in a second arrangement with respect to drivable mating component 12 in which contact surface 20 contacts first axial surface 22 of drivable mating component 12. The second arrangement is shown in FIGS. 2a to 2c.

In this embodiment, first axial contact surface 18 is formed on a base portion of the second axial side of thrust washer 14 and extends contiguously circumferentially in a single plane of thrust washer 14. First axial contact surface 18 extends from an inner circumference to an outer circumference of thrust washer 14 in regions where protrusions or tabs 30 including second axial contact surface 20 and retaining features 32 are not provided. Tabs 30 extending axially away from first axial contact surface 18 and are stepped to include second axial contact surface 20 a third axial distance X3 from axial contact surface 18 and a further axial surface 34 a fourth axial distance X4 from axial contact surface 18. Fourth axial distance X4 is greater than third axial distance X3. In the embodiment shown in FIGS. 1a to 1c and 2a to 2c, thrust washer 14 includes four tabs 30 defining second axial contact surfaces 20 and further axial surfaces 34. Tabs 30 each include a first axial protrusion defined by a first step 36 formed by second axial contact surface 20 and a first radial wall 38 and a second axial protrusion defined by second step 40 formed by further axial surface 34 and a second radial wall 42. First radial wall 38 is arc shaped such that second axial contact surface 20 is arc shaped, and second radial wall 42 is arc shaped such that further axial surface 34 has a semi-circular shape. First radial walls 38 each extend axially from the respective first axial contact surface 18 to the respective second axial contact surface 20 and second radial walls 42 each extend axially from the respective second axial contact surface 20 to the respective further axial surface 34. Tabs 30 are formed at the inner circumference of thrust washer 14 such that both first and second axial contact surfaces 18, 20 and first and second radial walls 38, 42 extend to the inner circumference of thrust washer 14. First axial contact region 18 surrounds second axial contact regions 20 and second axial contact regions 20 surround further axial surface 34.

Drivable mating component 12 includes a first set of holes 44 extending radially from first contact regions 26 and a second set of holes 46 extending radially from second contact regions 28. In this embodiment, holes 44, 46 each have a circular cross-section. First and second contact regions 26, 28 alternate circumferentially on first axial surface 22 of drivable mating component 12 such that each first contact region 26 is between two second contact regions 28 and each second contact region 28 is between two first contact regions 26. First holes 44 are defined by first radial walls 48 extending axially from first axial surface 22 to second axial surface 24 and second holes 46 are defined by second radial walls 50 extending axially from first axial surface 22 to second axial surface 24. In this embodiment, drivable mating component 12 includes four holes 44 and four holes 46 alternating circumferentially. In the first arrangement, which is shown in FIGS. 1a to 1c, tabs 30 are circumferentially aligned in first holes 44 such that first radial walls 38 of thrust washer 14 are received in respective first holes 44 and contact radially outer sections of respective first radial walls 48 of drivable mating component 12. First axial contact surface 18 is in contact with both first contact regions 26 and second contact regions 28.

Thrust washer 14 also includes retaining features 32, which in this embodiment are formed by four alignment posts 51 extending from first axial contact surface 18. Alignment posts 51 are aligned with the outer circumference of thrust washer 14. In this embodiment, alignment posts 51 are radially aligned with second holes 46 and are radially outside of second holes 46. Two of alignment posts 51 includes retaining clips 53 extending radially inward from ends of the respective posts 51 and are configured for contacting second axial surface 24 of drivable mating component 12 to axially fix thrust washer 14 to drivable mating component 12. Drivable mating component 12 also includes a first set of retention holes 52 extending radially from second contact regions 28 and a second set of retention holes 54 extending radially from first contact regions 26. In this embodiment, drivable mating component 12 includes four first retention holes 52 and four second retention holes 54 and first and second retention holes 52, 54 alternate circumferentially in drivable mating component 12 such that each first retention hole 52 is between two second retention holes 54 and each second retention hole 54 is between two first retention holes 52. In the first arrangement, which is shown in FIGS. 1a to 1c, posts 51 are circumferentially aligned in first retention holes 52 such that radial walls 56 of posts 51 are received in respective first retention holes 52 and contact radially inner sections of respective first radial walls 58 of first retention holes 52.

FIGS. 2a to 2c show thrust assembly 10 in the second arrangement. FIG. 2a shows a perspective view of thrust assembly 10 showing second axial surface 24 of drivable mating component 12 and axial contact surfaces 18, 20. Although FIG. 2a shows second axial surface 24, but not first axial surface 22, portions of first axial surface 22 are identified in FIG. 2a by their corresponding locations. FIG. 2b shows a perspective view of an enlarged section of thrust assembly 10 showing second axial surface 24 of drivable mating component 12 and axial contact surfaces 18, 20. FIG. 2c shows a cross-sectional side view of a section of thrust assembly 10 along B-B in FIG. 2a.

In the second arrangement shown in FIGS. 2a to 2c, tabs 30 are circumferentially aligned in second holes 46 such that first radial walls 42 of thrust washer 14 are received in respective second holes 46 and contact radially outer sections of respective second radial walls 50 of drivable mating component 12. Second axial contact surfaces 20 are in contact with respective second contact regions 28. Alignment posts 51 are circumferentially aligned with first holes 44 and are radially outside of first holes 44. Posts 51 are circumferentially aligned in second retention holes 54 such that radial walls 56 of posts 51 are received in respective second retention holes 52 and contact radially inner sections of respective second radial walls 59 of second retention holes 54.

A method for forming a torque converter including thrust assembly 10 may include determining a desired effective height of thrust surface 16 based on a distance between drivable mating component 12 and a further component facing thrust surface 16. The desired effective height includes a first effective height and a second effective height. The first axial contact surface 18 is then aligned to contact axial contact surface 29 of drivable mating component 12 if the desired effective height is the first effective height or aligning second axial contact surface 20 with axial contact surface 29 of drivable mating component 12 if the desired effective height is the second effective height. The alignment of the first axial contact surface 18 with the axial contact surface 29 includes inserting retention posts 51 through first retention holes 52 and inserting the first axial protrusions 36 into first alignment holes 44. The alignment of the second axial contact surface 20 with axial contact surface 29 includes inserting retention posts 51 through second retention holes 54 and inserting the second axial protrusions 40 into the second alignment holes 46.

To improve durability, thrust washer 14 may be formed of metal, preferably steel, and may include a wear surface, for example Torlon, on the metal to form thrust surface 16.

Figure 3:
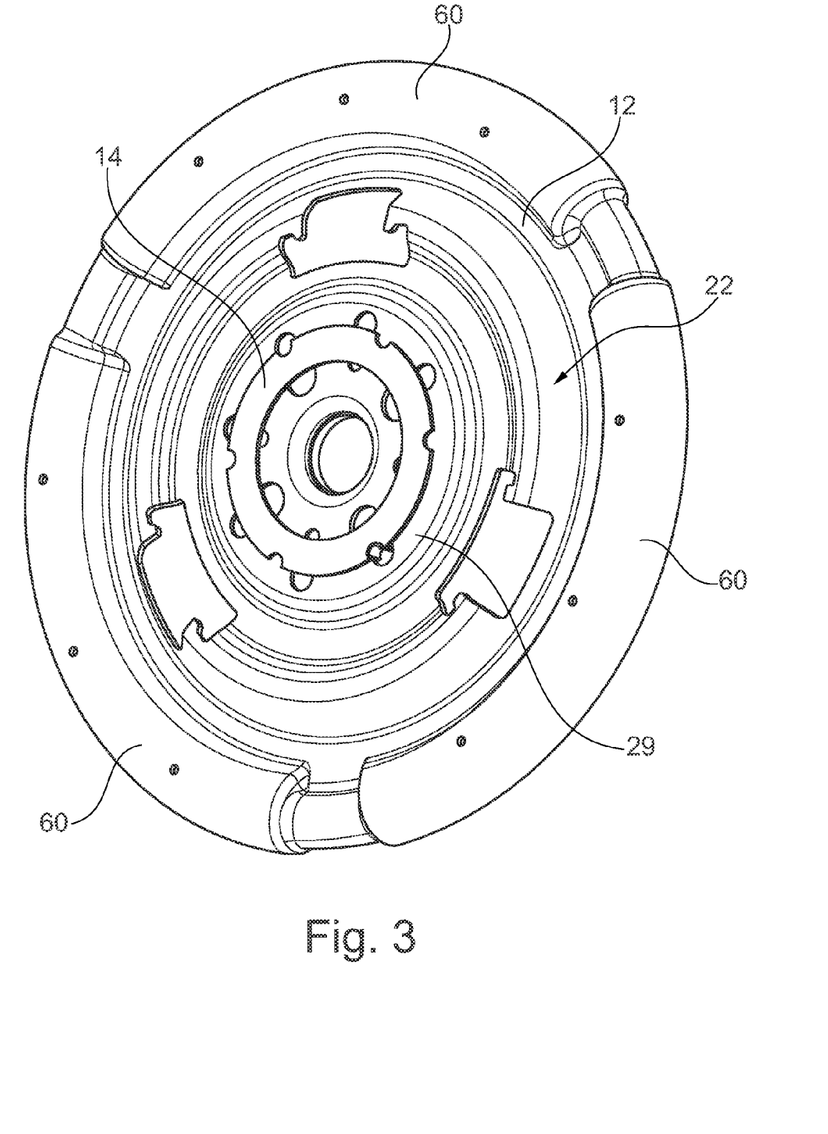
FIG. 3 shows a perspective view illustrating the thrust assembly shown in FIGS. 1a to 1c and 2a to 2c.

FIG. 3 shows a perspective view illustrating thrust washer 14 attached to drivable mating component 12 to form thrust assembly 10. In this embodiment, drivable mating component 12 is a damper spring retainer configured for use in a torque converter. Damper spring retainer 12 includes three arc-shaped radially outer spring receiving sections 60 for receiving arc springs.

Figure 4:
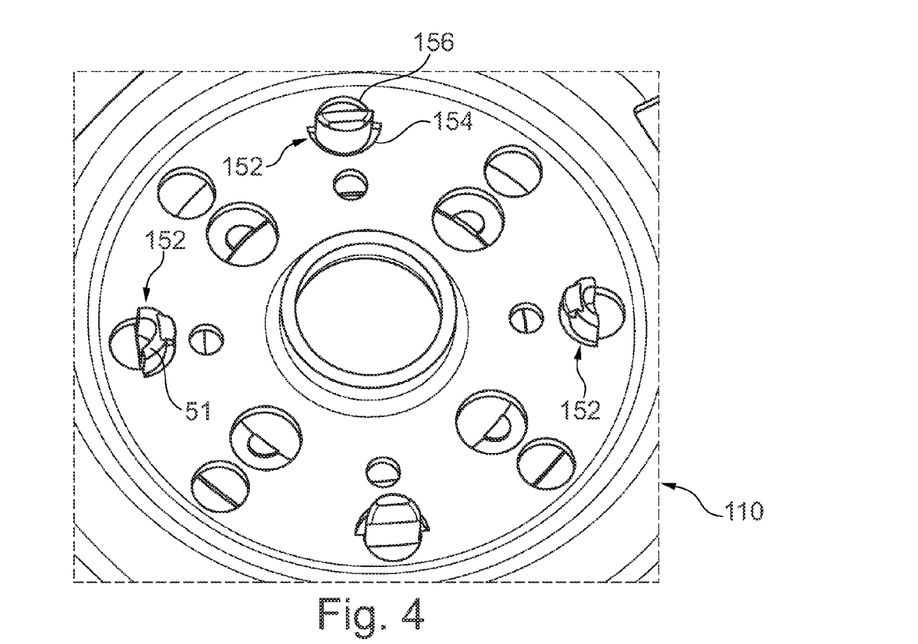
FIG. 4 shows a thrust assembly for a torque converter in accordance with another embodiment of the present invention in a first arrangement.
Figure 5:
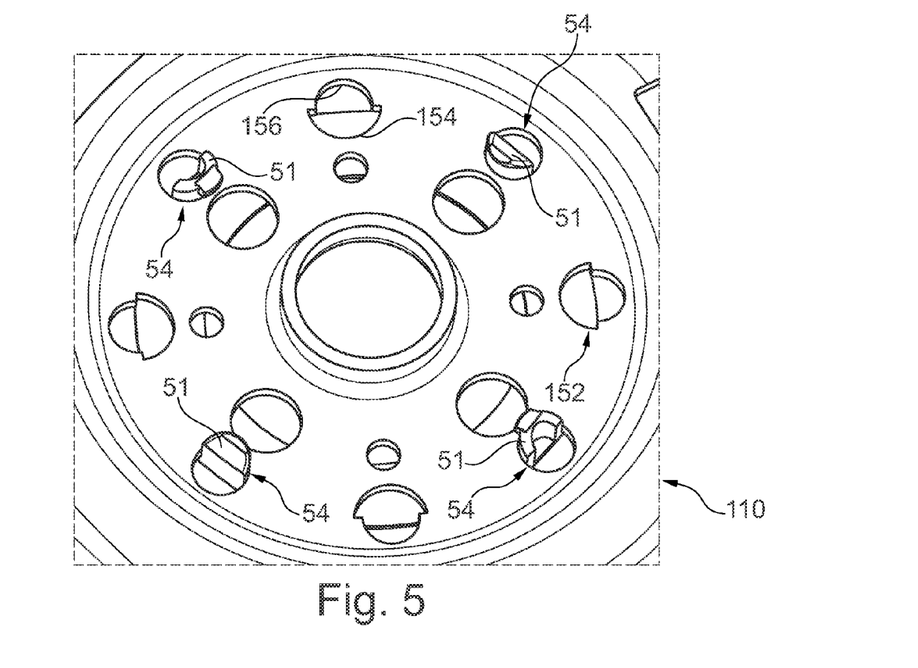
FIG. 5 shows the thrust assembly shown in FIG. 4 in a second arrangement.

FIG. 4 shows a thrust assembly 110 for a torque converter in accordance with another embodiment of the present invention in the first arrangement and FIG. 5 shows thrust assembly 110 in the second arrangement. Thrust assembly 110 is configured in the same manner as thrust assembly 10 shown in FIGS. 1a to 1c, 2a to 2c and 3, except that circular holes 52 are replaced by holes 152 having two different circumferential sections of different radii. Each hole 152 includes an inner section 154, which is approximately half of hole 152, having a first radius and an outer section 156, which is approximately half of hole 152, having a second radius lesser than the first radius. As shown in FIGS. 3 and 4, posts 51 are received in holes 152 in the first arrangement and are received in holes 54 in the second arrangement.

Figures 6A, 6B, 6C, 7:
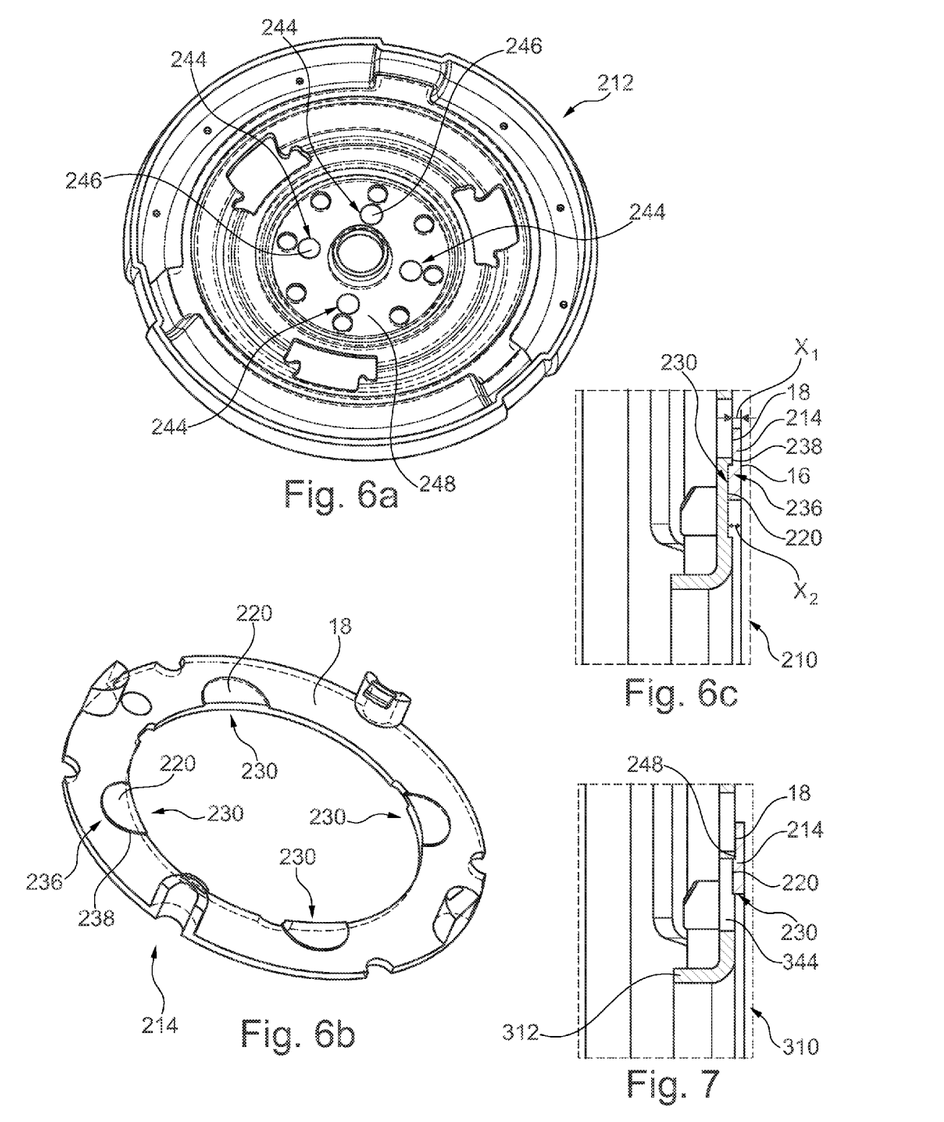
FIGS. 6a to 6c show a thrust assembly for a torque converter in accordance with another embodiment of the present invention.
FIG. 7 shows a cross-sectional side view of a thrust assembly for a torque converter in accordance with another embodiment of the present invention.

FIGS. 6a to 6c show a thrust assembly 210 for a torque converter in accordance with another embodiment of the present invention. Thrust assembly 210 includes a drivable mating component 212 and a thrust washer 214. FIG. 6a shows drivable mating component 212, FIG. 6b shows thrust washer 214 and FIG. 6c shows a cross-sectional side view of thrust assembly 210 in the first arrangement. Thrust washer 214 is configured in the same manner as washer 14 shown in FIGS. 1a to 1c, 2a to 2c and 3, except that tabs 30 are replaced by tabs 230 formed by only one step 236 and including only a second axial contact surface 220 having an essentially semi-circular shape, and not a further axial surface. Step 236 is formed by second axial contact surface 220 and a first radial wall 238. First radial wall 238 extends axially from first contact surface 18 to second axial contact surface 220.

Drivable mating component 212 is configured in the same manner as drivable mating component 12 shown in FIGS. 1a to 1c, 2a to 2c and 3, except that drivable mating component 212 does not include holes 44, 46 passing completely therethrough. Instead, drivable mating component 212 includes holes 244 formed therein in the form of bores which do not extend completely through drivable mating component 212, but instead only extend partially through drivable mating component 212 and include a bottom 246. Bores 244 are depressed with respect to a flat contact surface 248 of a first axial surface of drivable mating component 212.

First axial contact surface 18 is at a first axial distance X1 from thrust surface 16 and second axial contact surface 220 is at a second axial distance X2 from thrust surface 16. First and second axial contact surfaces 18, 220 are configured for alternatively contacting flat contact surface 248 of drivable mating component 212 so as to vary an effective height of thrust surface 16 with respect to drivable mating component 212. In this embodiment, thrust washer 214 has a first effective height with respect to drivable mating component 212 when thrust washer 214 is in a first arrangement with respect to drivable mating component 212 in which contact surface 18 contacts flat contact surface 248 of drivable mating component 212. In the first arrangement, tabs 230 are received in respective bores 244 such that second contact surface 220 contacts bore bottom 246. The first arrangement is shown in FIG. 6c. Also in this embodiment, thrust washer 214 has a second effective height with respect to drivable mating component 212, which is greater than the first effective height, when thrust washer 214 is in a second arrangement with respect to drivable mating component 212 in which contact surface 220 contacts flat contact surface 248 of drivable mating component 12 circumferentially between bores 244.

FIG. 7 shows a cross-sectional side view of a thrust assembly 310 for a torque converter in accordance with another embodiment of the present invention. Thrust assembly 310 includes a drivable mating component 312 and thrust washer 214 described with respect to FIGS. 6a to 6c. Drivable mating component 312 is configured in the same manner as drivable mating component 312 shown in FIGS. 6a and 6c, except that bores 244 are replaced by holes 344 extending completely through drivable mating component 312. In this embodiment, thrust washer 214 has a first effective height with respect to drivable mating component 312 when thrust washer 214 is in a first arrangement with respect to drivable mating component 312 in which contact surface 18 contacts flat contact surface 248 of drivable mating component 212. In the first arrangement, tabs 230 are received in respective holes 344. The first arrangement is shown in FIG. 7. Also in this embodiment, thrust washer 214 has a second effective height with respect to drivable mating component 312, which is greater than the first effective height, when thrust washer 214 is in a second arrangement with respect to drivable mating component 312 in which contact surface 220 contacts flat contact surface 248 of drivable mating component 312 circumferentially between holes 344.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A thrust assembly for a torque converter comprising:
a drivable mating component; and
a thrust washer connected to the drivable mating component, the thrust washer including a thrust surface on a first axial side thereof and at least two axial contact surfaces on a second axial side thereof opposite the first axial side, the at least two axial contact surfaces configured for axially contacting an axial contact surface of a first axial side of the drivable mating component, the at least two axial contact surfaces including at least a first axial contact surface at a first axial distance from the thrust surface and a second axial contact surface at a second axial distance from the thrust surface, the first and second axial contact surfaces configured for contacting the axial contact surface of the drivable mating component so as to vary an effective height of the thrust surface with respect to the drivable mating component such that the effective height is a first value when the first axial contact surface contacts the axial contact surface of the drivable mating component and the effective height is a second value different from the first value when the second axial contact surface contacts the axial contact surface of the drivable mating component.

2. The thrust assembly as recited in claim 1 wherein the drivable mating component includes a second axial surface opposite the axial contact surface of the drivable mating component, the effective height of the thrust surface with respect to the drivable mating component being variable by the thrust surface being a first axial distance from the second axial surface of the drivable mating component when the thrust washer is in a first arrangement in which the first axial contact surface contacts the axial contact surface of the drivable mating component and the thrust surface being a second axial distance from the second axial surface of the drivable mating component when the thrust washer is in a second arrangement in which the second axial contact surface contacts the axial contact surface of the drivable mating component, the second axial distance being greater than the first axial distance.

3. The thrust assembly as recited in claim 2 wherein the drivable mating component includes a first hole extending radially from the axial contact surface of the drivable mating component, the thrust washer including a first radial wall extending axially from the first axial contact surface, the first radial wall being received in the first hole when the thrust washer is in the first arrangement.

4. The thrust assembly as recited in claim 3 wherein the drivable mating component includes a second hole extending radially from the axial contact surface of the drivable mating component, the thrust washer including a second radial wall extending axially from the second axial contact surface, the second radial wall being received in the second hole when the thrust washer is in the second arrangement.

5. The thrust assembly as recited in claim 4 wherein the second hole is circumferentially offset from the first hole.

6. The thrust assembly as recited in claim 1 wherein the first axial contact surface surrounds the second axial contact surface.

7. The thrust assembly as recited in claim 1 wherein the thrust washer includes an inner diameter surface and an outer diameter surface, the first axial contact surface and the second axial contact surface extending to the inner diameter surface.

8. The thrust assembly as recited in claim 1 wherein the thrust washer includes an anti-rotation feature extending through at least one hole in the drivable mating component.

9. The thrust assembly as recited in claim 1 wherein the drivable mating component is a damper spring retainer.

10. The thrust assembly as recited in claim 1 wherein the second axial side of the thrust washer includes a further surface, the first axial contact surface being axially offset from the further surface a first distance, the second axial contact surface being axially offset from the further surface a second distance, the second distance being greater than the first distance.

11. The thrust assembly as recited in claim 1 wherein the thrust washer includes a plurality of posts passing through a first set of corresponding holes in the drivable mating component for securing the thrust washer to the drivable mating component in a first arrangement, the plurality of posts passing through a second set of corresponding holes in the drivable mating component for securing the thrust washer to the drivable mating component in a second arrangement, the first set of holes being circumferential offset from the second set of holes.

12. The thrust assembly as recited in claim 11 wherein the first set of holes and the second set of holes are radially aligned with each other.

13. The thrust assembly as recited in claim 11 wherein the axial thrust surface is at a first axial location when the thrust washer is secured to the drivable mating component in the first arrangement and the axial thrust surface is at a second axial location when the thrust washer is secured to the drivable mating component in the second arrangement, the first axial location being axially offset from the second axial location.

14. The thrust assembly as recited in claim 11 wherein the posts are metal.

15. The torque converter comprising the thrust assembly as recited in claim 1.

16. A thrust assembly for a torque converter comprising:
a drivable mating component; and
a thrust washer connected to the drivable mating component, the thrust washer including a thrust surface on a first axial side thereof and at least two axial contact surfaces on a second axial side thereof opposite the first axial side, the at least two axial contact surfaces configured for axially contacting an axial contact surface of a first axial side of the drivable mating component, the at least two axial contact surfaces including at least a first axial contact surface at a first axial distance from the thrust surface and a second axial contact surface at a second axial distance from the thrust surface, the first and second axial contact surfaces configured for alternatively contacting the axial contact surface of the drivable mating component so as to vary an effective height of the thrust surface with respect to the drivable mating component, wherein the axial contact surface of the drivable mating component includes a bore extending partially through the drivable mating component.

17. A method for forming a torque converter comprising:
providing a thrust washer having a first axial surface forming a thrust surface and a second axial surface opposite the thrust surface, the second axial surface including at least a first axial contact surface and a second axial contact surface;
providing a drivable mating component for mounting the thrust washer, the drivable mating component including an axial contact surface;
determining a desired effective height of the thrust surface based on a distance between the drivable mating component and a further component facing the thrust surface, the desired effective height including a first effective height and a second effective height; and
aligning the first axial contact surface to contact the axial contact surface of the drivable mating component if the desired effective height is the first effective height or aligning the second axial contact surface with the axial contact surface of the drivable mating component if the desired effective height is the second effective height.

18. The method as recited in claim 17 wherein the thrust washer includes a plurality of retention posts and the drivable mating component includes a plurality of first retention holes and second retention holes for receiving the retention posts, the aligning the first axial contact surface with the axial contact surface of the drivable mating component including inserting the retention posts through the first retention holes, the aligning the second axial contact surface with the axial contact surface of the drivable mating component including inserting the retention posts through the second retention holes.

19. The method as recited in claim 17 wherein the drivable mating component includes a plurality of first alignment holes and second alignment holes, the thrust washer including a plurality of first axial protrusions extending from the first axial contact surface and a plurality of second axial protrusions extending from the second axial contact surface, the aligning the first axial contact surface with the axial contact surface of the drivable mating component including inserting the first axial protrusions into the first alignment holes, the aligning the second axial contact surface with the axial contact surface of the drivable mating component including inserting the second axial protrusions into the second alignment holes.

20. The method as recited in claim 17 wherein the drivable mating component is a damper spring retainer.

* * * * *